United States Patent
George et al.

(10) Patent No.: US 11,855,569 B2
(45) Date of Patent: Dec. 26, 2023

(54) MOTOR CONTROL UNIT

(71) Applicant: McLaren Automotive Limited, Surrey (GB)

(72) Inventors: Sunoj Cherian George, Surrey (GB); Tao Chang, Surrey (GB)

(73) Assignee: McLaren Automotive Limited, Woking (GB)

( * ) Notice: Subject to any disclaimer, the term of this patent is extended or adjusted under 35 U.S.C. 154(b) by 46 days.

(21) Appl. No.: 17/154,819

(22) Filed: Jan. 21, 2021

(65) Prior Publication Data
US 2021/0226573 A1    Jul. 22, 2021

(30) Foreign Application Priority Data
Jan. 22, 2020    (GB) ...................................... 2000939

(51) Int. Cl.
*H02P 29/032*    (2016.01)
*B60L 15/12*    (2006.01)
*B60L 15/32*    (2006.01)

(52) U.S. Cl.
CPC ............ *H02P 29/032* (2016.02); *B60L 15/12* (2013.01); *B60L 15/32* (2013.01); *B60L 2240/423* (2013.01)

(58) Field of Classification Search
CPC ..... A61B 5/14532; G16H 40/40; B60L 15/12; B60L 15/32; B60L 2240/423; B60L 3/0092; B60W 50/023; H02P 29/032
(Continued)

(56) References Cited

U.S. PATENT DOCUMENTS 8,018,185 B2 * 9/2011 Yamamoto ............ B60L 15/025
318/434
2005/0251308 A1    11/2005 Funcke et al.
(Continued)

FOREIGN PATENT DOCUMENTS

| CN | 108146250 | 6/2018 |
|---|---|---|
| EP | 2052938 | 10/2008 |
| WO | WO 200023315 | 4/2000 |

OTHER PUBLICATIONS

UK Search Report in United Kingdome Appln. No. GB2000939.5, dated Jul. 17, 2020, 2 pages.
(Continued)

*Primary Examiner* — David Luo
(74) *Attorney, Agent, or Firm* — Fish & Richardson P.C.

(57) ABSTRACT

A motor control unit for a vehicle comprising an electric drive motor, the motor control unit comprising a first processor, a second processor and a third processor, in which: the third processor is configured to: receive an actuation demand for the vehicle; calculate a torque for the motor in dependence on the actuation demand; and provide the calculated torque to the first processor; the first processor is configured to: receive the calculated torque and a control input of the vehicle; and determine a first control output for the electric drive motor in dependence on the calculated torque and the control input; and the second processor is configured to: receive the first control output from the first processor and the control input of the vehicle; calculate a second control output for the motor in dependence on the control input; and validate the first control output by comparison to the second control output.

19 Claims, 4 Drawing Sheets

(58) Field of Classification Search
USPC .......................................... 318/274, 273, 255
See application file for complete search history.

(56) References Cited

U.S. PATENT DOCUMENTS

| | | |
|---|---|---|
| 2008/0208402 A1 | 8/2008 | Vhasure et al. |
| 2008/0208492 A1 | 8/2008 | Vhasure et al. |
| 2014/0229064 A1* | 8/2014 | Arnold ................. B60L 3/0092 701/41 |
| 2017/0131698 A1 | 5/2017 | Hatakeyama et al. |
| 2020/0369284 A1* | 11/2020 | Chen ................. B60W 50/0097 |

OTHER PUBLICATIONS

UK Search Report in United Kingdom Appln. No. GB2000939.5, dated Jul. 17, 2020, 1 page.
UK Search Report in United Kingdome Appln. No. GB2000939.5, dated Mar. 16, 2021, 3 pages.
EP Search Report and Written Opinion in European Appln. No. 21152587.8, dated May 26, 2021, 8 pages.
[No Author Listed], "BSI Standards Publication," BS ISO 26262 Part 1-Part 12, Second Edition, Dec. 31, 2018, 826 pages.

* cited by examiner

MOTOR CONTROL UNIT

CLAIM OF PRIORITY

This application claims priority to UK Patent Application Serial No. 2000939.5, filed on Jan. 22, 2020, the entire contents of which are hereby incorporated by reference.

BACKGROUND

This invention relates to a motor control unit for a vehicle comprising at least one electric drive motor.

Electric and hybrid vehicles are well known and are becoming increasingly prevalent as the desire to reduce carbon emissions increases. In a typical electric or hybrid vehicle, at least one electric drive motor drives one or more wheels of the vehicle. Each electric drive motor is typically powered by a battery, and is under the control of a motor control unit (MCU). Each motor control unit receives control inputs from vehicle control units, for processing in order to determine control outputs for the respective motor that it controls.

As vehicle technology develops, the number of control inputs that may be relevant to the control of an electric drive motor is increasing. For example, control inputs may include user inputs, such as throttle pedal inputs, brake pedal inputs, vehicle setting selections (such as the selection of a sport or economy mode, a launch control mode, or a level of traction control), or any other user inputs. Control inputs may also include other inputs, such as conditions sensed by the vehicle (e.g. external temperature, road condition, tyre condition, or current vehicle weight), or the level of available battery power remaining.

The response time for an MCU may be defined as the time taken for a change in control input to result in a change in control output for the electric drive motor. The response time of a typical MCU can be adversely affected by the increasing number of control inputs that may be relevant to the control of an electric drive motor and the resultant latency of these inputs arriving at the MCU for processing.

Increased MCU response times may affect a user's experience of a vehicle. Vehicle functional safety requirements (e.g. those defined by ISO 26262) are also becoming more stringent. Increased MCU response times may lead to vehicle functional safety requirements not being met.

It would therefore be desirable if there was an improved motor control unit for a vehicle comprising an electric drive motor.

SUMMARY OF THE INVENTION

According to a first aspect of the present invention there is provided a motor control unit for a vehicle comprising an electric drive motor, the motor control unit comprising a first processor, a second processor and a third processor, in which: the third processor is configured to: receive an actuation demand for the vehicle; calculate a torque for the motor in dependence on the actuation demand; and provide the calculated torque to the first processor; the first processor is configured to: receive the calculated torque and a control input of the vehicle; and determine a first control output for the electric drive motor in dependence on the calculated torque and the control input; and the second processor is configured to: receive the first control output from the first processor and the control input of the vehicle; calculate a second control output for the motor in dependence on the control input; and validate the first control output by comparison to the second control output.

The first processor may be further configured to provide the first control output to the electric drive motor.

The motor control unit may further comprise: a dedicated communication bus configured to provide the actuation demand to the third processor, the dedicated communication bus being configured to communicate information related to actuation demands only.

The motor control unit may further comprise: a general communication bus configured to provide the control input of the vehicle to the first processor and the second processor.

The actuation demand received by the third processor may be a raw control input.

The actuation demand received by the third processor may be a pre-processed control input.

The third processor may be further configured to: monitor at least one of the first processor and the second processor; and control the electric drive motor in the event of a fault of one or more of the first processor and/or second processor.

The third processor may execute safety functions for the electric drive motor in the event of a fault of one or more of the first processor and/or second processor.

The third processor may be connected to the gate drivers of the electric drive motor.

The third processor may cause an active short circuit of the electric drive motor.

The third processor may be further configured to monitor a second third processor comprised within a second motor control unit for a second electric drive motor of the vehicle.

The third processor may be further configured to execute safety functions for the second electric drive motor in the event that a fault is detected during monitoring the second third processor comprised within the second motor control unit.

The third processor may cause an active short circuit of the second electric drive motor.

According to a second aspect of the present invention there is provided a motor control unit for a vehicle comprising an electric drive motor, the motor control unit comprising a first processor, a second processor and a third processor, in which: the first processor is configured to: receive a control input of the vehicle; and determine a first control output for the electric motor in dependence on the control input; the second processor is configured to: receive the first control output from the first processor and the control input of the vehicle; determine a second control output for the electric drive motor in dependence on the control input; and validate the first control output by comparison to the second control output; and the third processor is configured to: monitor at least one of the first processor and the second processor; and control the electric drive motor in the event of a fault of one or more of the monitored first processor and/or second processor.

The third processor may execute safety functions for the electric drive motor in the event of a fault of one or more of the first processor and/or second processor.

The third processor may be connected to the gate drivers of the electric drive motor.

The third processor may cause an active short circuit of the electric drive motor.

The third processor may be further configured to monitor a second third processor comprised within a second motor control unit for a second electric drive motor of the vehicle.

The third processor may be further configured to execute safety functions for the second electric drive motor in the event that a fault is detected during monitoring the second third processor comprised within the second motor control unit.

The third processor may cause an active short circuit of the second electric drive motor.

The first processor may be further configured to provide the first control output to the electric drive motor.

The third processor may be further configured to: receive an actuation demand for the vehicle; and calculate a torque for the motor in dependence on the actuation demand.

The motor control unit may further comprise: a dedicated communication bus configured to provide an actuation demand to the third processor, the dedicated communication bus being configured to communicate information related to actuation demands only.

The actuation demand may be received by the third processor is a raw control input.

The actuation demand received by the third processor may be a pre-processed control input.

The motor control unit may further comprise: a general communication bus configured to provide the control input of the vehicle to the first processor and the second processor.

BRIEF DESCRIPTION OF THE DRAWINGS

The present invention will now be described by way of example with reference to the accompanying drawings. In the drawings.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
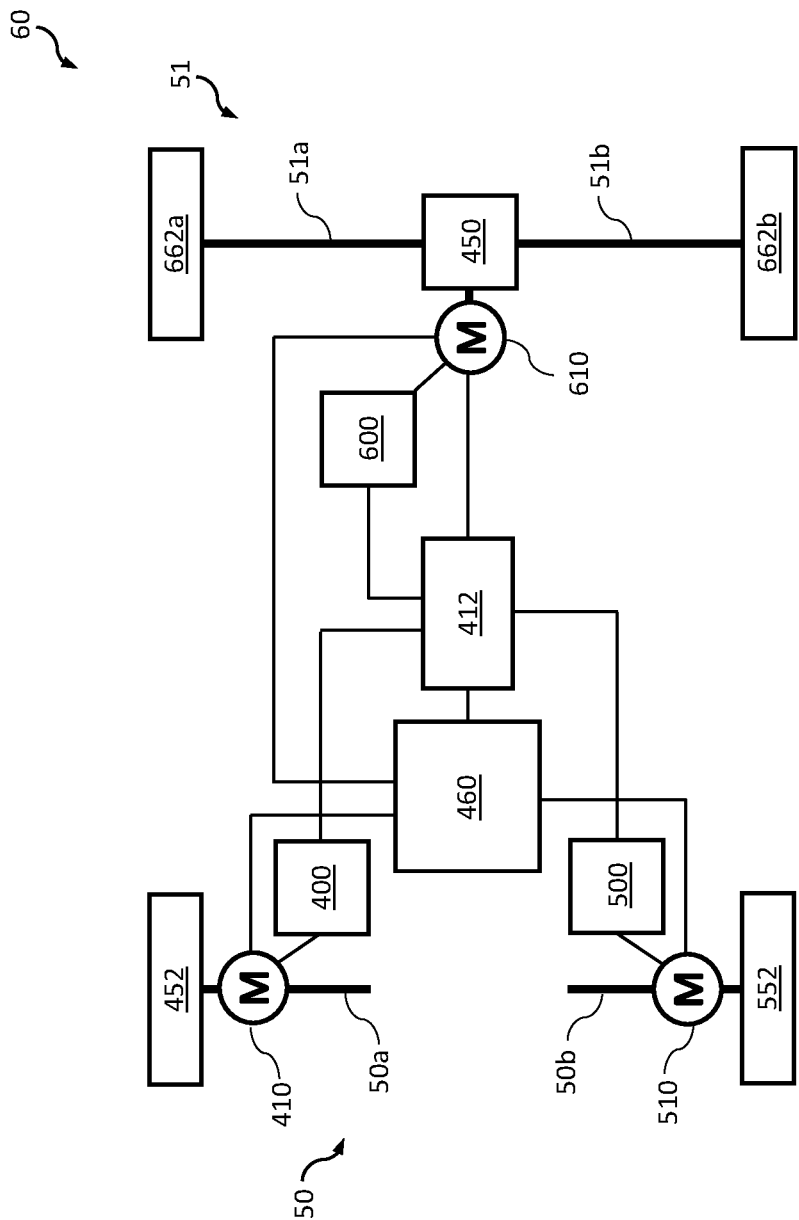
FIG. 1 shows the layout of an electric vehicle.

FIG. 1 shows the layout of an electric vehicle 60. The vehicle shown is an all-wheel drive vehicle. The vehicle comprises four wheels 452, 552, 662a and 662b. Wheels 452 and 552 are positioned on half-shafts 50a and 50b of axle 50 respectively. Wheels 452 and 552 can be driven by electric drive motors 410 and 510 respectively. That is, axle 50 may be referred to as a driven axle. Wheels 662a and 662b are positioned on axle half-shafts 51a and 51b of axle 51 respectively. Wheels 452 and 552 can both be driven by electric drive motor 610. That is, axle 51 may be referred to as a driven axle. A differential 450 is positioned between electric drive motor 610 and wheels 662a and 662b. The purpose of differential is to allow wheels 662a and 662b to rotate at different speeds (e.g. when the vehicle is turning).

An electric drive motor converts electrical energy into mechanical energy. Typically, electric motors operate through the interaction between a magnetic field and an electric current in a wire winding to generate force in the form of rotation of a shaft. Referring to FIG. 1, said rotation may be used to drive axle half-shafts 50a, 50b, 51a, or 51b and hence wheels 452, 552, 662a and/or 662b. Electric motors can be powered by direct current (DC) sources. Electric drive motors 410, 510, 610 are powered by battery 460. Battery 460 may be direct current (DC) source.

Electric drive motors 410, 510, 610 are under the control of motor control units (MCUs) 400, 500 and 600 respectively. MCUs 400, 500 and 600 each receive control inputs from vehicle control unit 412, and determine control outputs for the respective motor that they control. Vehicle control unit 412 as described herein may provide any form of input relevant to the control of the vehicle. For example, vehicle control unit 412 may provide user inputs, such as throttle pedal inputs.

It is to be understood that the principles described herein need not be applied to an electric vehicle as shown in FIG. 1. In an example, the principles described herein can be applied to other all-wheel drive vehicles having two driven axles. For example, the principles described herein can be applied to an all-wheel drive vehicle in which both driven axles resemble axle 50, or both driven axles resemble axle 51. In another example, the principles described herein can be applied to vehicles with only one driven axle, such as rear-wheel drive vehicles or front-wheel drive vehicles. In such vehicles, the driven axle may resemble axle 50, or axle 51. In some examples, the electric vehicle may have more than two axles. For example, the electric vehicle may be a lorry. That is, an electric vehicle in accordance with the principles described herein may have one or more electric drive motors.

It is to be understood that the principles described herein can need not be applied to an electric vehicle. The principles described herein may be applied to a hybrid vehicle. A hybrid vehicle may comprise an internal combustion engine for driving one or more of the wheels, in addition to one or more electric drive motors.

Figure 2:
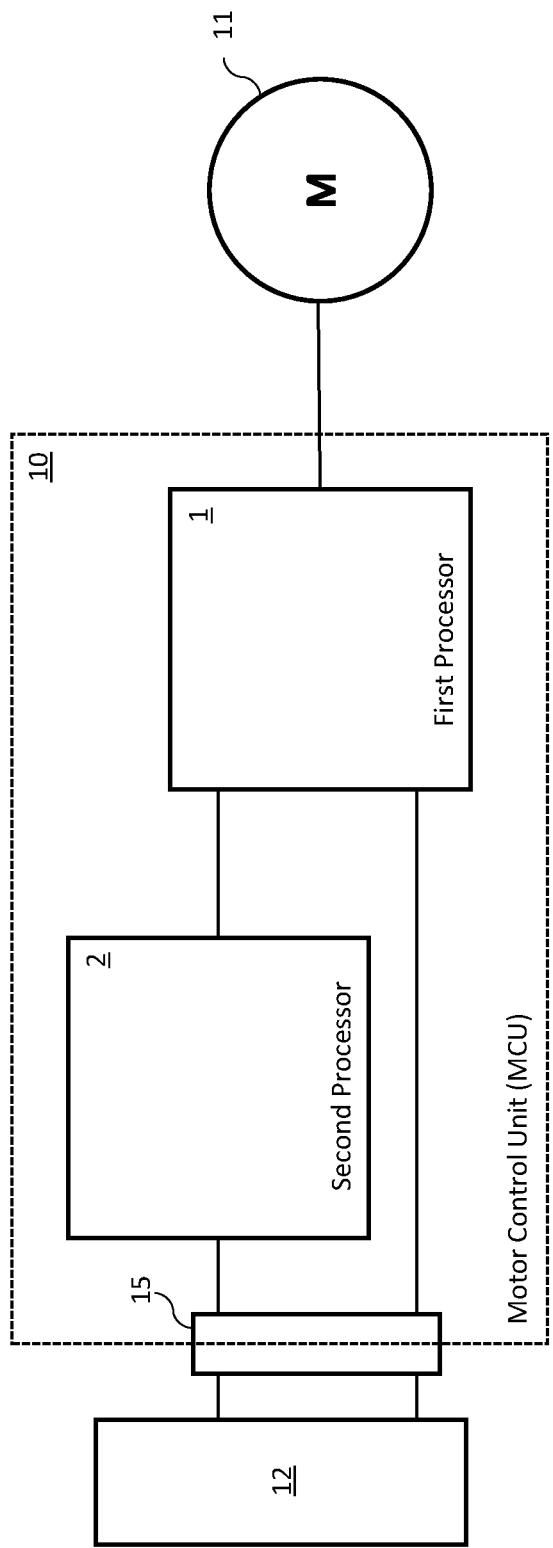
FIG. 2 shows a typical motor control unit for an electric drive motor.

FIG. 2 shows a typical motor control unit 10 for an electric drive motor. Electric drive motor 11 is under the control of motor control unit (MCU) 10. That is, MCU 10 determines control outputs for motor 11.

MCU 10 comprises a first processor 1 and a second processor 2. MCU 10 receives control inputs from control input 12. Control inputs may be received via a communication bus 15, such as a control area network (CAN) bus.

The first and second processors 1 and 2 may be microcontrollers. A microcontroller may be embodied on a single integrated circuit chip. A microcontroller may comprise a microprocessor, which may include one or more CPUs capable of processing the received control inputs so as to generate control outputs.

The first processor 1 may output a first control output to the electric drive motor 11. The second processor 2 usually performs a watchdog function in such an architecture. That is, the first processor 1 may be configured to receive a control input from control input 12. The first processor 1 may determine a first control output in dependence on the control input. The first processor 1 may provide the first control output to the motor 11. The first processor 1 may also provide the first control output to the second processor 2. The second processor 2 may be configured to receive the same control input from control input 12 as the first processor 1. The second processor 2 may be configured to calculate a second control output in dependence on the control input 12. The second processor 2 may receive the first control output from the first processor 1. The second processor 2 may validate the received first control output by comparison to the second control output. If the first control output and the second control output do not match, or are not within an acceptable tolerance, the second processor 2 may exert a safety function. For example, the second processor 2 may cause the motor 11 to be shut down. A fault in either the first processor 1 or the second processor 2 may cause the mismatch between first control output and the second control output.

As described herein, control inputs may be read into MCU 10 via a communication bus 15, such as a control area network (CAN) bus. A CAN bus is a type of communication bus typically used in vehicle control systems. A CAN bus designed to allow microcontrollers and devices to communicate with each others' applications without a host computer.

Vehicle control unit 412 may provide any form of input relevant to the control of the vehicle. For example, control inputs may include user inputs, such as throttle pedal inputs, brake pedal inputs, vehicle setting selections (such as the selection of a sport or economy mode, a launch control mode, or a level of traction control), or any other user inputs. Control inputs may also include other inputs, such as conditions sensed by the vehicle (e.g. external temperature, road condition, tyre condition, or current vehicle weight), or the level of available battery power remaining. As vehicle technology develops, the number of control inputs that may be relevant to the control of a vehicle is increasing.

For this reason, there is typically a high level of information traffic on communication bus 15. This can lead to the control inputs experiencing high levels of latency when traversing the communication bus 15. That is, the information traffic on communication bus 15 may limit the response time of the motor control unit 10, and ultimately the motor 10, to control inputs. The response time may be defined as the time taken for a change in control input to result in a change in control output provided to the motor 11.

Raw control inputs (e.g. throttle pedal position/travel) may also be pre-processed by vehicle control unit 12 so as to form pre-processed inputs suitable for interpretation by the MCU. Said pre-processing may be performed before the control inputs are communicated to MCU 10 via communication bus 15. The time taken to perform said pre-processing also effects the MCU response time.

Increased MCU response times may affect a user's driving experience of a vehicle. For example, the average human response time is typically in the region of 200 ms. It has been observed that typical torque related control inputs traversing a typical CAN bus may experience latencies of approximately greater than 250 ms especially in multi-actuator electric drive propulsion systems (e.g. hybrid powertrains, multi-motor electric axles). If the MCU response time exceeds the human response time for the user of the vehicle, the user may be able to perceive a delay in the vehicle's response to their actions (e.g. a change in throttle pedal position).

Vehicle functional safety requirements (e.g. those defined by ISO 26262) are also becoming more stringent. Increased MCU response times may lead to vehicle functional safety requirements not being met.

Figure 3:
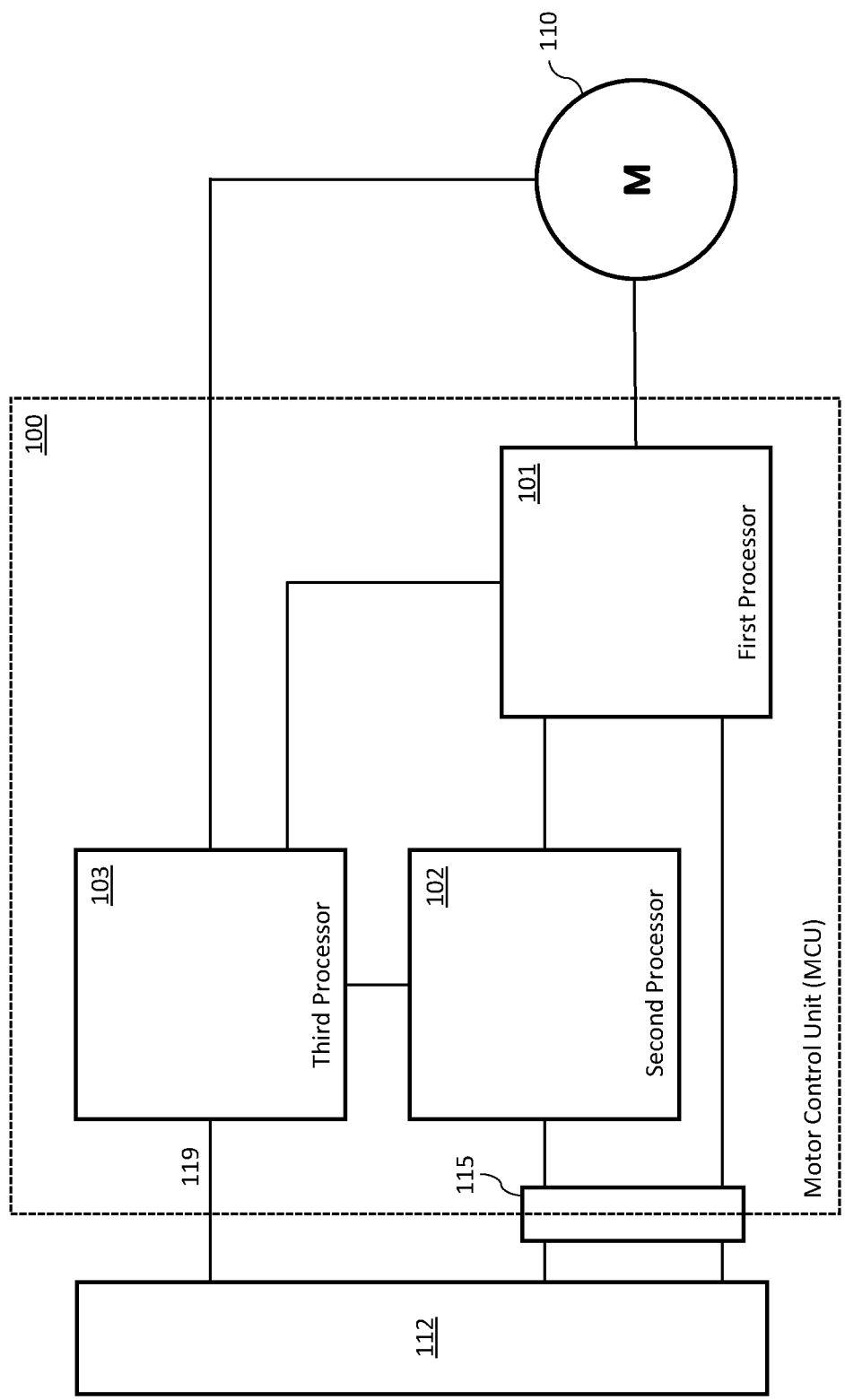
FIG. 3 shows a motor control unit for an electric drive motor in accordance with the principles described herein.

FIG. 3 shows a motor control unit for an electric drive motor in accordance with the principles described herein.

Electric drive motor 110 is under the control of motor control unit (MCU) 100. That is, MCU 100 determines control outputs for motor 110.

MCU 100 comprises a first processor 101, a second processor 102 and a third processor 103. MCU 100 receives control inputs from vehicle control unit 112. The first processor 101 and the second processor 102 may receive control inputs via a communication bus 115, such as a control area network (CAN) bus. The third processor 103 may receive control inputs via a dedicated communication bus 119, such as a control area network (CAN) bus. The third processor 103 may receive a subset of the control inputs received by the first and second processors. For example, the third processor 103 may receive control inputs related only to actuation demands. In some examples, the third processor 103 receives raw control inputs (e.g. throttle pedal position/travel). In other examples, the third processor 103 receives pre-processed control inputs.

An actuation demand is an amount of propulsive force requested by the user to drive the vehicle in a particular direction. Torque can be defined as the turning force through a radius. Electric drive motors are configured to produce a torque to rotate one or more wheels of an electric or hybrid vehicle. Power can be defined as rotational speed multiplied by torque. Thus, an actuation demand may relate to a demand for a torque to be applied to the one or more wheels by the electric drive motor, or a resultant power to be achieved by the electric drive motor.

The first, second and third processors 101, 102 and 103 may be microcontrollers. A microcontroller may be embodied on a single integrated circuit chip. A microcontroller may comprise a microprocessor, which may include one or more CPUs capable of processing the received control inputs so as to generate control outputs.

Each of the first, second and third processors 101, 102 and 103 may comprise processor logic and non-volatile memory. Alternatively, each of the first, second and third processors 101, 102 and 103 may comprise processor logic and the MCU may comprise a shared non-volatile memory accessible by each of the first, second and third processors 101, 102 and 103. In either example, memory may store a set of program instructions that are executable by the processor logic, and reference data such as look-up tables that can be referenced by the processor logic in response to those instructions. The processor logic may be configured to operate in accordance with a computer program stored in non-transitory form on a machine-readable storage medium. The memory may be the machine-readable storage medium. The computer program may store instructions for causing the processor logic to perform any of the methods described herein.

In a first implementation, the third processor 103 may be configured to calculate a torque or power for the motor. The first processor 101 may receive the calculate torque and output a first control output to the electric drive motor 110. The second processor 102 may perform a watchdog function.

That is, the third processor 103 may be configured to receive an actuation demand from the vehicle control unit 112 of the vehicle. The actuation demand may be received via a dedicated communication bus 119. That is, communication bus 119 may be configured to communicate control inputs relating to actuation demands only, an no other control inputs. An advantage of having a dedicated control input is that the information traffic on that dedicated control input can be limited. Thus, the latency experienced by control inputs traversing the dedicated communication bus may be less than that experienced on a general communication bus, such as communication bus 115. For example, the actuation demand traversing a dedicated communication bus 119 may experience latencies less than 50 ms, preferably less than 20 ms, and most preferably in the region of 10 ms—significantly less than the observed latencies of approximately 250 ms experienced by typical torque related control inputs traversing a typical CAN bus.

The third processor 103 may be configured to calculate a torque for the motor 110 in dependence on the actuation demand. The calculated torque may be a function of an overall vehicle torque coordinating function.

The actuation demand may be in the form of a raw control input (e.g. a throttle pedal position/travel). In this case, the control functions that are responsible for pre-processing the control input associated with an actuation demand may be co-located in the third processor with the control functions responsible for calculating the torque for the motor. Co-locating these control functions in this way can be advantageous to a vehicle control network as it minimises the number of separate control units required in the network—and thus minimises the number and/or size of the connections required for communication between those control units. Furthermore. communicating raw control inputs to the third processor 103 can further reduce the time taken for the information required to calculate a torque to reach the third processor 103. In other examples, the third processor 103 may receive an actuation demand in the form of a pre-processed torque control input.

The third processor 103 may be configured to provide the calculated torque to the first processor 101. The first processor 101 may be configured to receive the calculated torque and a control input from vehicle control unit 112. The first processor 101 may determine a first control output in dependence on the calculated torque and the control input. The first processor 101 may provide the first control output to the motor 110.

The second processor 102 may receive the first control output from the first processor 101. The second processor 102 may also be configured to receive the same control input from vehicle control unit 112 as the first processor 101. In some examples, the second processor 102 also receives the calculated torque from the third processor 103. However, this is not required, as the torque can be calculated from the control inputs received via communication bus 102. The second processor 102 may be configured to calculate a second control output in dependence on the vehicle control unit 112 (and, if received, the calculated torque). The second processor 102 may validate the received first control output by comparison to the second control output. If the first control output and the second control output do not match, or are not within an acceptable tolerance, the second processor 102 may exert a safety function. For example, the second processor 102 may cause the motor 110 to be shut down. A fault in either the first processor 101 or the second processor 102 may cause the mismatch between first control output and the second control output.

By having the third processor 103 provide a calculated torque to the first processor 101 in accordance with the principles described herein, the response time of the MCU to actuation demands may be significantly reduced. MCUs including a third processor in accordance with the principles described herein have been found to be capable of responding to actuation demands in less than 100 ms. In examples, this may enable control systems such as an electronic stability control system (ESP), axle anti-vibration control (AVC), or an anti-lock braking system (ABS) to access fast torque reactions. Vehicle dynamics related to torque intervention (such as ESP, AVC, ABS, etc) can therefore be improved through the fast acting torque response enabled by a motor control unit configured in accordance with the principles described herein. This may improve the experience of the user of the vehicle, as the results of timely torque reactions via the electric drive motors are often user-perceivable.

Additionally, the third processor 103 may process other electrical and/or mechanical functions. For example, the third processor 103 may process battery load current and/or voltage management functions, or cooling functions of the electric drive components. In this way, the third processor 103 enables better state management of the entire electric drive system owing to the faster response path provided by the dedicated communication bus 119 to the third processor 103 within the MCU 100.

In a second implementation, the third processor 103 may be configured to monitor the function of, and execute safety functions for, the MCU 100. The first processor 101 may provide a control output to the electric drive motor 110. The second processor 102 may perform a watchdog function.

That is, the first processor 101 may be configured to receive an input from a vehicle control unit 112 of the vehicle. The first processor 101 may be configured to determine a first control output for the motor 110 in dependence on the input. The first processor 101 may provide the control output to the motor 110. The second processor 102 may receive the first control output from the first processor 101. The second processor 102 may also be configured to receive the same control input from vehicle control unit 112 as the first processor 101. The second processor 102 may be configured to calculate a second control output in dependence on the vehicle control unit 112. The second processor 102 may validate the received first control output by comparison to the second control output.

The third processor 103 may be configured to monitor at least one of the first processor 101 and the second processor 102. Said monitoring may involve validating the first and second control outputs. Validating may involve ensuring that the first and second control outputs are identical, or differ from one another within tolerable bounds. In another example, the monitoring may involve monitoring the first and/or second processors 101, 102 for observable fault patterns or fault signals. Examples of observable fault patterns or fault signals include any one or more of: output phase currents or voltages being out of range for a given operating condition, motor control variables being within tolerances, plausibility checks of all electrical and thermal variables.

The third processor 103 may be configured to control the motor 110 in the event of a fault of one or more of the monitored first processor 101 and/or second processor 102. Said control of the motor may involve executing safety functions for the motor 110. As shown in FIG. 3, the third processor 103 may be in communication with the motor.

For example, the third processor 103 may connect directly to the gate drivers of electric drive motor 110. In the event of a fault, the third processor 103 may cause an open circuit/six switch open (SSO) or an active short circuit (ASC) of the electric drive motor 110. Both SSO and ASC are defined by ISO 26262. For example, an active short circuit is a safety function that enables the electric drive motor 110 to free-wheel without mechanically locking. An active short circuit may comprise isolating the terminals of the electric drive motor from the battery powering that electric drive motor (e.g. battery 460 in FIG. 1). As described herein, this may be performed by the third processor 103. An active short circuit may avoid electrically damaging the battery powering the electric drive motor 110 through induced voltage (back EMFs) in the event of a braking/regeneration event. This may protect the battery and any associated power electronics and from an over-voltage. The ability of the MCU 100 to implement an active short circuit (ASC) in accordance with the principles described herein may avoid the need for a mechanical clutch.

As described with reference to FIG. 2, a fault in either the first processor 1 or the second processor 2 may cause the mismatch between first control output and the second control output. With reference to FIG. 3, the third processor 103 may be able to determine which of the first processor 101 and second processor 102 has faulted. In this manner, the third processor 103 may improve fault diagnosis.

In the second implementation, it is not essential that the third processor 103 is configured to receive a actuation demand via a dedicated communication bus 119 (as shown in FIG. 3). In fact, the third processor may receive the same control inputs as the first and second processors 101 and 102 via general communication bus 115 (not shown).

That said, the third processor 103 in the second implementation may also be configured to receive a actuation demand via a dedicated communication bus 119, additional safety advantages may be achieved. That is, the faster response to actuation demands (in accordance with the principles described herein) may also enable safety functions to be executed more quickly. In this manner, the safety of a vehicle comprising an electric drive motor and MCU in accordance with the principles described herein may be further improved, and/or the damage caused to any of the components of said vehicle in the event of a fault reduced (e.g. as safety functions such as an active short circuit can be executed more quickly).

It is to be understood that the third processor 103 could perform its functions described with reference to the first implementation and its functions described with reference to the second implementation in combination.

Figure 4:
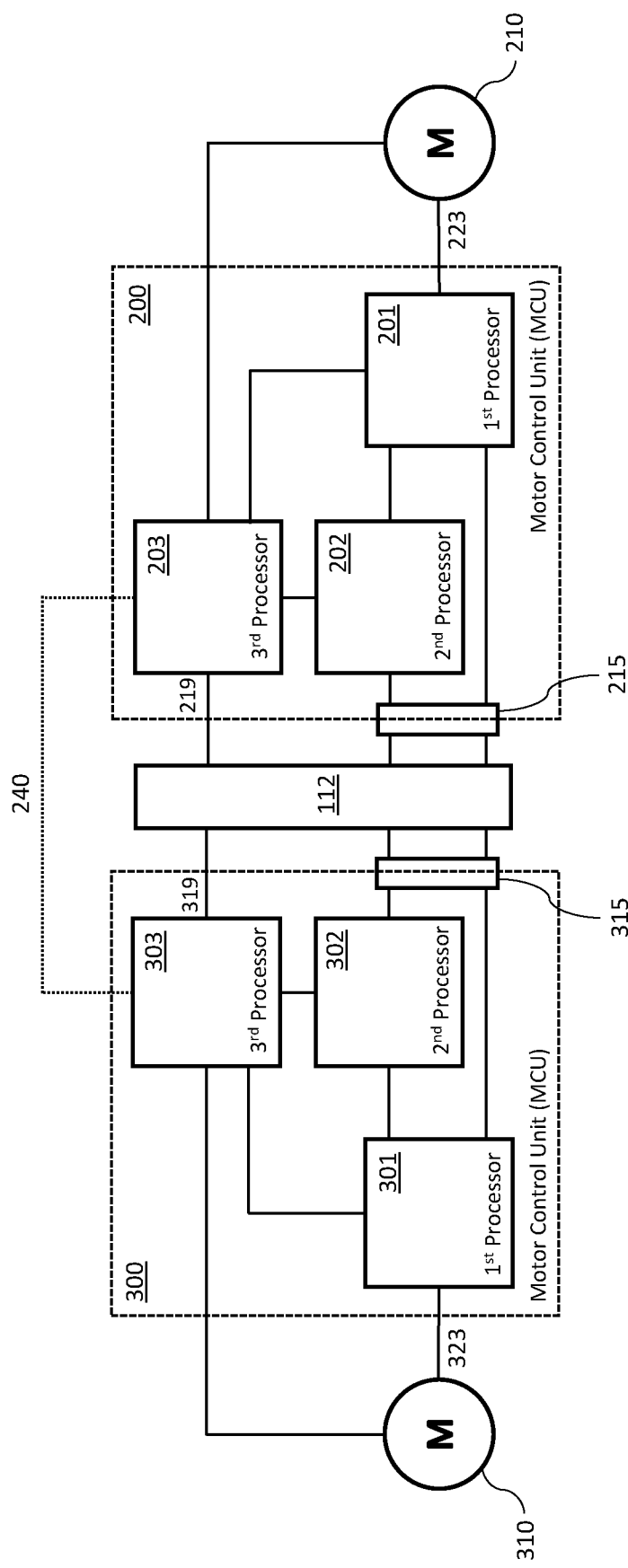
FIG. 4 shows first and second motor control units for first and second electric drive motors respectively in accordance with the principles described herein.

A third implementation is described with reference to FIG. 4. FIG. 4 shows a first motor control unit 200 and second motor control unit 300 in accordance with the principles described herein. Electric drive motor 210 is under the control of motor control unit (MCU) 200. Electric drive motor 310 is under the control of motor control unit (MCU) 300. Each motor control unit 200, 300 comprises a first processor 201, 301, a second processor 202, 302 and a third processor 203, 303 respectively. The first processor 201, 301 and the second processor 202, 302 of each MCU 200, 300 may perform any one or more of the functions of first processor 101 and second processor 102 respectively described with reference to FIG. 3.

The third processor 203 of the first MCU 200 may communicate 240 with the third processor 303 of the second MCU 300, and vice versa. The third processor 203 of the first MCU 200 may be configured to monitor the third processor 303 of the second MCU 300, and vice versa. Said monitoring may involve monitoring the third processor of the other MCU for observable fault patterns or fault signals.

In the event that the third processor 203 of the first MCU 200 detects a fault in the third processor 303 of MCU 300, the third processor 203 may be configured to cause safety functions as described herein to be executed for an electric drive motor 310 under the control of motor control unit 300, and vice versa.

Third processors 203 and 303 may also be configured to perform any one or more of the functions described with reference to FIG. 3.

For example, as described with reference to FIG. 3, each third processor 203, 303 may be configured to monitor at least one of the first processor 201, 301 and the second processor 202, 302 on its own MCU. Said monitoring may involve validating the first and second control outputs. Validating may involve ensuring that the first and second control outputs are identical, or differ from one another within tolerable bounds. In another example, the monitoring may involve monitoring the first and/or second processors 201, 202, 301, 302 on its own MCU for observable fault patterns or fault signals. If third processor 203 detects a fault on its own MCU, it may send a fault message to the third processor 303, and vice versa. Third processor 303 may act on such a fault message from third processor 203 of the first motor control unit 200 by causing safety functions to be executed for the first electric drive motor 210. Third processor 203 may act on such a fault message from third processor 303 of the second motor control unit 300 by causing safety functions to be executed for the first electric drive motor 310.

It is to be understood that the principles described herein with reference to FIG. 4 are not intended to be limited to electric or hybrid vehicles comprising two electric motors. As described with reference to FIG. 1, an electric of hybrid vehicle may have any number of electric drive motors each under the control of a respective motor control unit. Thus, there may be a network of third processors, with each third processor monitoring one or more of the other third processors in the network.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A motor control unit for a vehicle comprising an electric drive motor, the motor control unit comprising a first processor, a second processor and a third processor, in which:
the third processor is configured to:
receive an actuation demand for the vehicle;
calculate a torque for the electric drive motor in dependence on the actuation demand; and
provide the calculated torque to the first processor;
the first processor is configured to:
receive the calculated torque and a control input of the vehicle; and
determine a first control output for the electric drive motor in dependence on the calculated torque and the control input; and
the second processor is configured to:
receive the first control output from the first processor and the control input of the vehicle;
calculate a second control output for the electric drive motor in dependence on the control input; and
validate the first control output by comparison to the second control output;
wherein the motor control unit is configured to provide the first control output to the electric drive motor in order to control the electric drive motor.

2. A motor control unit as claimed in claim 1, wherein the first processor is configured to provide the first control output to the electric drive motor.

3. A motor control unit as claimed in claim 1, the motor control unit further comprising:
a dedicated communication bus configured to provide the actuation demand to the third processor, the dedicated communication bus being configured to communicate information related to actuation demands only.

4. A motor control unit as claimed in claim 1, the motor control unit further comprising:
a general communication bus configured to provide the control input of the vehicle to the first processor and the second processor.

5. A motor control unit as claimed in claim 1, wherein the actuation demand received by the third processor is a raw control input.

6. A motor control unit as claimed in claim 1, wherein the actuation demand received by the third processor is a pre-processed control input.

7. A motor control unit as claimed in claim 1, wherein the third processor is further configured to:
monitor at least one of the first processor and the second processor; and
control the electric drive motor in the event of a fault of one or more of the first processor and/or second processor.

8. A motor control unit as claimed in claim 7, wherein the third processor executes safety functions for the electric drive motor in the event of a fault of one or more of the first processor and/or second processor.

9. A motor control unit as claimed in claim 7, wherein the third processor is connected to the gate drivers of the electric drive motor.

10. A motor control unit as claimed in claim 9, wherein the third processor causes an active short circuit of the electric drive motor.

11. A motor control unit as claimed in claim 7, wherein the third processor is further configured to monitor a second third processor comprised within a second motor control unit for a second electric drive motor of the vehicle.

12. A motor control unit as claimed in claim 11, wherein the third processor is further configured to execute safety functions for the second electric drive motor in the event that a fault is detected during monitoring the second third processor comprised within the second motor control unit.

13. A motor control unit as claimed in claim 12, wherein the third processor causes an active short circuit of the second electric drive motor.

14. A motor control unit for a vehicle comprising an electric drive motor, the motor control unit comprising a first processor, a second processor and a third processor, in which:
the first processor is configured to:
receive a control input of the vehicle; and
determine a first control output for the electric drive motor in dependence on the control input;
the second processor is configured to:
receive the first control output from the first processor and the control input of the vehicle;
determine a second control output for the electric drive motor in dependence on the control input; and
validate the first control output by comparison to the second control output; and
the third processor is configured to:
monitor at least one of the first processor and the second processor; and
control the electric drive motor in the event of a fault of one or more of the monitored first processor and/or second processor by executing one or more safety functions for the electric drive motor.

15. A motor control unit as claimed in claim 14, wherein the third processor is connected to the gate drivers of the electric drive motor.

16. A motor control unit as claimed in claim 15, wherein the third processor causes an active short circuit of the electric drive motor.

17. A motor control unit as claimed in claim 14, wherein the third processor is further configured to monitor a second third processor comprised within a second motor control unit for a second electric drive motor of the vehicle.

18. A motor control unit as claimed in claim 17, wherein the third processor is further configured to execute safety functions for the second electric drive motor in the event that a fault is detected during monitoring the second third processor comprised within the second motor control unit.

19. A motor control unit as claimed in claim 18, wherein the third processor causes an active short circuit of the second electric drive motor.

* * * * *